(12) United States Patent
Otte et al.

(10) Patent No.: US 10,789,729 B2
(45) Date of Patent: Sep. 29, 2020

(54) SYSTEM AND METHOD(S) FOR DETERMINING PROJECTILE IMPACT LOCATION

(71) Applicant: Ti Training Corp., Golden, CO (US)

(72) Inventors: Gregory Otte, Lakewood, CO (US); Todd R. Brown, Lakewood, CO (US); Joseph J. Mason, Lakewood, CO (US); Michael Pettigrew, Denver, CO (US)

( * ) Notice: Subject to any disclaimer, the term of this patent is extended or adjusted under 35 U.S.C. 154(b) by 136 days.

(21) Appl. No.: 16/213,284

(22) Filed: Dec. 7, 2018

(65) Prior Publication Data
US 2019/0180470 A1 Jun. 13, 2019

Related U.S. Application Data

(60) Provisional application No. 62/595,921, filed on Dec. 7, 2017.

(51) Int. Cl.
| | |
|---|---|
| *G06T 7/00* | (2017.01) |
| *G06T 7/73* | (2017.01) |
| *G06T 7/11* | (2017.01) |
| *G06T 7/13* | (2017.01) |
| *G06T 5/30* | (2006.01) |
| *G06T 7/80* | (2017.01) |
| *F41J 9/14* | (2006.01) |
| *F41J 5/10* | (2006.01) |
| *G06T 5/00* | (2006.01) |
| *F41J 11/00* | (2009.01) |

(52) U.S. Cl.
CPC ................ *G06T 7/73* (2017.01); *F41J 5/10* (2013.01); *F41J 9/14* (2013.01); *G06T 5/005* (2013.01); *G06T 5/30* (2013.01); *G06T 7/11* (2017.01); *G06T 7/13* (2017.01); *G06T 7/80* (2017.01); *F41J 11/00* (2013.01); *G06T 2207/10016* (2013.01); *G06T 2207/30204* (2013.01)

(58) Field of Classification Search
CPC ..... G06T 7/73; G06T 7/80; G06T 7/11; G06T 7/13; G06T 5/005; G06T 5/30; G06T 2207/10016; G06T 2207/30204; F41J 5/10; F41J 9/14; F41J 11/00
See application file for complete search history.

(56) References Cited

U.S. PATENT DOCUMENTS

| | | | | |
|---|---|---|---|---|
| 2008/0213732 | A1* | 9/2008 | Manard | F41J 9/14 434/16 |
| 2012/0013712 | A1* | 1/2012 | Flagg | H04N 5/332 348/46 |
| 2014/0218341 | A1* | 8/2014 | Ichieda | G06F 3/0425 345/175 |
| 2014/0335479 | A1* | 11/2014 | Northrup | F41A 33/02 434/22 |
| 2016/0180532 | A1* | 6/2016 | Katramados | G06K 9/4661 382/103 |

(Continued)

*Primary Examiner* — Ping Y Hsieh
(74) *Attorney, Agent, or Firm* — Leyendecker & Lemire, LLC (57) ABSTRACT

A system and method for determining a projectile impact location is described. Embodiments of the projectile impact location system can include, but is not limited to, a control module, a camera with removable filter, a projector, and a light source. The projectile impact location system can be implemented to determine a location of a projectile impact and generate coordinates of the impact location for use by an animation engine.

18 Claims, 5 Drawing Sheets

(56) References Cited

U.S. PATENT DOCUMENTS

2016/0298930 A1* 10/2016 Squire .................. F41G 3/26
2018/0292172 A1* 10/2018 Ehrlich ................ F41G 3/065
2019/0147219 A1* 5/2019 Thornbrue ......... G06K 9/00208
                       348/169

* cited by examiner

SYSTEM AND METHOD(S) FOR DETERMINING PROJECTILE IMPACT LOCATION

CROSS-REFERENCE TO RELATED APPLICATION

This application claims the benefit of U.S. Provisional Application No. 62/595,921, filed Dec. 7, 2017.

BACKGROUND

Weapon training in a virtual environment is well known. Currently, systems implement modified weapons having lasers that activate when the weapon is fired to accurately determine where a user is firing their weapon. There are many advantages to implementing this type of training, mostly in savings from firing live rounds and from a safety standpoint. However, since the weapons are modified to fire lasers, users do not get live action training, especially with how the firearm will actually operate when firing a live round. Alternatively, live action training is well known, but tedious to provide instantaneous analytics back to a trainee. Further, training scenarios are limited to interacting with static targets or mechanically moving targets. When training in a shooting range, the trainee is typically limited to paper targets and then manually determining how well they scored.

Weapon use in entertainment settings is also well known currently. Systems are available that allow a user to fire a modified weapon at a screen to shoot various targets including zombies and bad guys. Similar to currently available weapon training systems, the weapons are typically modified to fire a laser and do not allow for use of live ammunition.

As such, there is a need for a system capable of providing virtual interactive scenarios to a user who may interact with said scenarios with live rounds.

DETAILED DESCRIPTION

Embodiments of the present invention include a system and method for determining an impact location of a projectile fired from a weapon. Typically, the system can include, but is not limited to, a control module, a camera including a lens filter, an infrared light source, and a projector. The projectile impact location system can generally be implemented in an indoor shooting range including at least one target comprising a substantially white sheet of paper or similar material. The system can be adapted to detect and generate coordinates of an impact location of a projectile on the target fired from a weapon. In one embodiment, the projectile impact location system may further include an animation engine. In another embodiment, the animation engine may be in communication with the control module of the system, but may be provided by another party or located remotely from the control module.

In one embodiment, the projectile impact location system can include one or more applications or programs configured to determine an impact location of a projectile on a target surface. The projectile impact location system may include a control application configured to determine when to run other applications of the system. For instance, the control application can determine when to perform a first process and a second process. The control application can be configured to receive, store, and send data or information from one application to another application. Further, the control application may include logic for determining when to run one or more applications.

In one embodiment, the control application may launch the animation engine which can be configured to produce a display on a target surface. The animation engine can include, but is not limited to, Adobe Flash, Unreal Engine, and Unity Engine. Of note, the control module may have access to one or more animation engines. Content for the animation engine can be packaged in a file folder generated by a standard editor of the animation engine. A collection of the file folders can be stored in a location (e.g., a database of the control module) known to the control application. Each content folder may also include a preview image of a game and a descriptor file that tells the control application what type of animation engine should be used for that content and how to launch that animation engine. The control application can directly connect to a video streaming application (or program) to obtain images from the camera.

The first process may be an area-of-interest method and the second process may be a projectile impact location (or shot detection) method. Typically, the two methods can be used in combination to detect a location of an impact of a projectile on a target. The area-of-interest method can be implemented to define a detection area for the camera that filters out everything but the defined detection area. Typically, the area of a target can be the defined detection area and the area-of-interest method can be implemented to ensure the projectile impact location system focuses solely on the defined detection area. The projectile impact location method can be implemented to continuously scan, recognize, and output coordinates for holes or perforations caused by a projectile in the defined detection area. Of note, both the first process and the second process may be implemented as applications run by the control module through the control application. It is to be appreciated that the system may implement one or both of the processes depending on how the system is configured.

In some embodiments, the projectile impact location system can be implemented with an animation engine configured to provide interactive scenarios to a user. The projectile impact location system can be used in combination with the animation engine to activate an action in the interactive scenario based on a location of a projectile impact. As can be appreciated, in such a combination, a user may interact with a live action interactive scenario with their firearm and fire live ammunition with the projectile impact location system determining where a projectile (e.g., bullet)

hit on a screen (e.g., a target) displaying the live action interactive scenario. The projectile impact location system may generate coordinates to send to the animation engine causing the animation engine to change actions of the live action interactive scenario based on where the system determines the projectile hit on the target.

In a typical implementation, the projectile impact location system can be housed in a unit on wheels that can be placed in a lane in an indoor shooting range. Of note, the unit can typically be sized to fit under a table found in most indoor shooting ranges. The camera of the projectile impact location system can first be calibrated with a target in said shooting lane. After the camera has been calibrated, a user can select one of a plurality of different interactive scenarios presented by the control application via a touch display. The control application may then cause the animation engine to run the selected interactive scenario, with the projectile impact location system detecting any hits on the target from a weapon fired by the user. The projectile impact location system can translate the coordinates of the hit to coordinates understood by the animation engine. The animation engine may then execute a "mouse click" on the approximate location of the detected projectile impact and branch the scenario accordingly. Typically, the interactive scenario may include a defined area in the video/animation that includes at least one target of the interactive scenario. As can be appreciated, the "mouse click" can effectively determine whether a user hit an intended target area in the interactive scenario. For instance, the target may be a silhouette of a zombie. The projectile impact location system may determine where on the target surface area the user hit with a live round. The system may then translate the coordinates of the projectile impact location to one correlating with the display area of the interactive scenario. As can be appreciated, the animation engine may perform a mouse click approximate the location determined by the system and the animation engine may then determine if the projectile impact location was within the silhouette of the zombie. The animation engine may then branch the interactive scenario based on the projectile impact location system determining a location of the projectile impact.

The present invention can be embodied as devices, systems, methods, and/or computer program products. Accordingly, the present invention can be embodied in hardware and/or in software (including firmware, resident software, micro-code, etc.). Furthermore, the present invention can take the form of a computer program product on a computer-usable or computer-readable storage medium having computer-usable or computer-readable program code embodied in the medium for use by or in connection with an instruction execution system. In one embodiment, the present invention can be embodied as non-transitory computer-readable media. In the context of this document, a computer-usable or computer-readable medium can include, but is not limited to, any medium that can contain, store, communicate, propagate, or transport the program for use by or in connection with the instruction execution system, apparatus, or device.

The computer-usable or computer-readable medium can be, but is not limited to, an electronic, magnetic, optical, electromagnetic, infrared, or semiconductor system, apparatus, device, or propagation medium.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

The term "software," as used in this specification and the appended claims, refers to programs, procedures, rules, instructions, and any associated documentation pertaining to the operation of a system.

The term "firmware," as used in this specification and the appended claims, refers to computer programs, procedures, rules, instructions, and any associated documentation contained permanently in a hardware device and can also be flashware.

The term "hardware," as used in this specification and the appended claims, refers to the physical, electrical, and mechanical parts of a system.

The terms "computer-usable medium" or "computer-readable medium," as used in this specification and the appended claims, refers to any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

The term "signal," as used in this specification and the appended claims, refers to a signal that has one or more of its characteristics set or changed in such a manner as to encode information in the signal. It is to be appreciated that wireless means of sending signals can be implemented including, but not limited to, Bluetooth, Wi-Fi, acoustic, RF, infrared and other wireless means.

An Embodiment of a Projectile Impact Location System

Figure 1A:
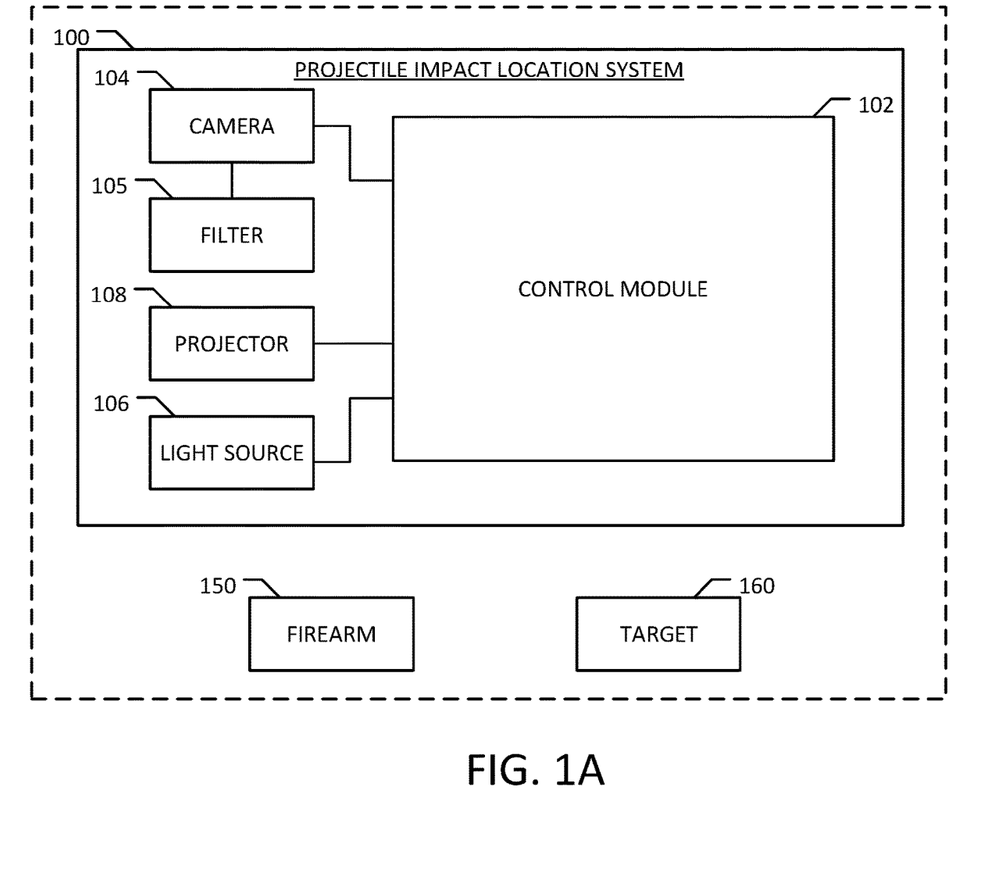
FIG. 1A is a block diagram of a projectile impact location system according to one embodiment of the present invention.

Referring to FIG. 1A, a block diagram of an embodiment 100 of a projectile impact location system is illustrated. The projectile impact location system 100 can be implemented to detect where a projectile hit a target and generate coordinates of said hit location. Typically, the coordinates can be converted to coordinates that may be used by an animation engine. The projectile impact location system 100 can be implemented in combination with a firearm 150 (or other weapons that shoot a projectile) and a target 160 to allow a user to interact with live ammunition in response to a simulated interactive scenario.

As shown in FIG. 1A, the projectile impact location system 100 can include, but is not limited to, a control module 102, a camera 104 including a removable lens filter 105, a light source 106, and a projector 108. The camera 104 and the projector 108 can be operatively connected to the control module 102.

The control module 102 can represent a server or another powerful, dedicated computer system that can support multiple user sessions. In some embodiments, the control module 102 can be any type of computing device including, but not limited to, a personal computer, a game console, a smartphone, a tablet, a netbook computer, or other computing devices. In one embodiment, the control module 102 can be a distributed system wherein control module functions are distributed over several computers connected to a network. In one instance, the control module 102 may be a tablet including a touch screen for input.

Figure 1B:
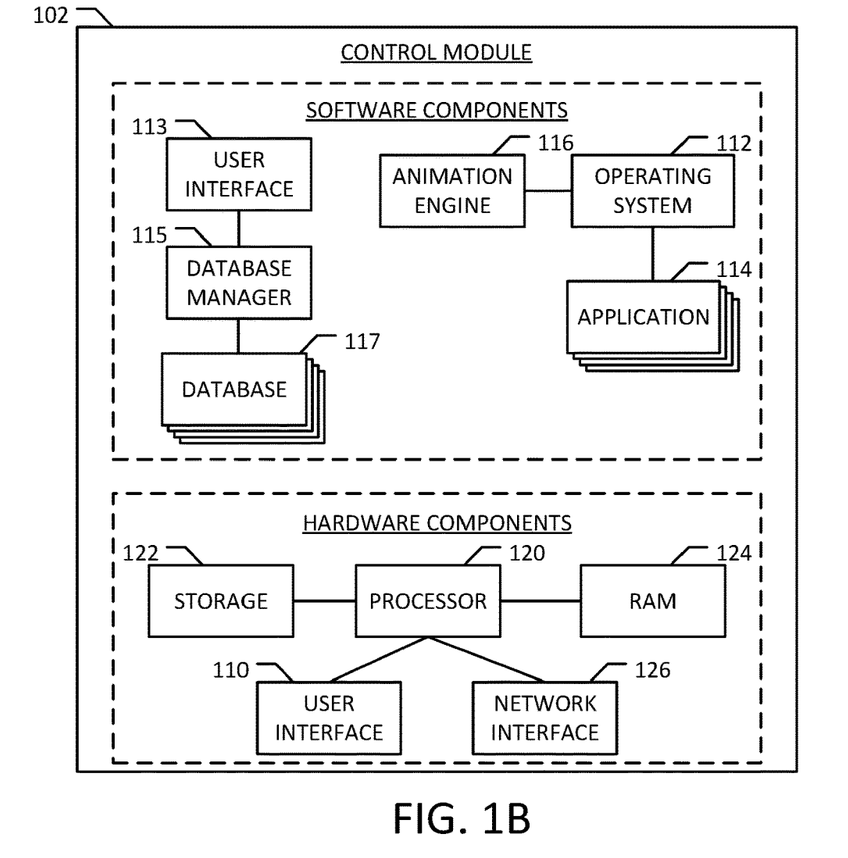
FIG. 1B is a block diagram of a control module of a projectile impact location system according to one embodiment of the present invention.

Referring to FIG. 1B, a detailed block diagram of the control module 102 is illustrated. As shown, the control module 102 can typically include hardware components and software components.

The software components of the control module 102 can include, but is not limited to, an operating system 112, one or more applications 114 or programs operable on the operating system, an animation engine 116, and one or more databases 117 for storing data. In one embodiment, the one or more applications 114 can include an application dedicated to determining an impact location of a projectile. For instance, the application can follow a process or method similar to the method described hereinafter as the second process. Typically, the one or more applications 114 may include a control application that can receive, store, and send data and information created by the one or more applications 114. The control application can include logic for determining when to implement the applications described hereinafter and when to send data from one application to another application. For instance, the control application may receive a mask image created by a first process and provide the mask image to a second process for use by the second process.

In one embodiment, the control module 102 may also include the animation engine 116 that can be implemented to run a plurality of interactive scenarios. In another embodiment, the animation engine may be located remotely from, and independently of, the control module 102. In such an embodiment, the animation engine may be in communication with the control application of the control module 102 and able to receive one or more signals including coordinate data from the control application. The software components may further include a user interface 113 and a database manager 115. The user interface 113 may be an interface which a user can access the database manager 115. The database manager 115 can be an application that runs queries against the databases 117. In one embodiment, the databases 117 may store animation content for use by the animation engine 116. The user interface 113 may present a visual display of interactive scenario options a user may select from.

The hardware platform of the control module 102 can include, but is not limited to, a processor 120, nonvolatile storage 122, random access memory 124, and a network interface 126. The processor 120 can be a single microprocessor, multi-core processor, or a group of processors. The random access memory 124 can store executable code as well as data that can be immediately accessible to the processor 120. The nonvolatile storage 122 can store executable code and data in a persistent state.

The hardware platform can include a user interface 110. The user interface 110 may include keyboards, monitors, touch screens, pointing devices, and other user interface components. In one embodiment, the user interface 110 may be a touch input (or touch screen).

The network interface 126 can include, but is not limited to, hardwired and wireless interfaces through which the control module 102 can communicate with other devices. For instance, the control module 102 may communicate with an animation engine located remotely from the control module 102 via the network interface 126. In one example, a network can be implemented to connect the control module 102 to other devices. As can be appreciated, the network may be any type of network, such as a local area network, wide area network, or the Internet. In some cases, the network can include wired or wireless connections and may transmit and receive information using various protocols.

Referring back to FIG. 1A, the camera 104 can be implemented to capture images of the target 160 and an area surrounding the target 160. Generally, the camera 104 can be a video camera capable of at least 30 frames per second and a minimal resolution of approximately 640×480 pixels per frame. In some embodiments, the camera 104 can be adapted to auto-focus on a target. As can be appreciated, a focus of the camera 104 can be manually altered. In one embodiment, the camera 104 can be a monochrome camera.

The camera 104 can further include the filter 105 that can be removably coupled proximate a lens of the camera 104. In some instances, the filter 105 may be coupled to the camera 104 such that the filter 105 may be rotated away from the lens or flipped up from the lens to effectively "remove" the filter 105 from the lens. In one embodiment, the filter 105 can block all electromagnetic radiation except in the infrared spectrum.

The light source 106 can be implemented to provide light in the infrared spectrum. Typically, the light source 106 can be directed towards a target and configured to completely illuminate the target and an area approximately surrounding the target. In one embodiment, the light source 106 can be an LED lamp that produces infrared light in the infrared spectrum. In some instances, the light source 106 may be operatively connected to the control module 102 where the control module 102 may determine when to turn the light source 106 on. In other instances, the light source 106 may be turned on and off manually.

The projector 108 can be implemented to project an image, animation, video, etc. from the control module 102. As can be appreciated, the projector 108 can project animations, images, videos etc. from an interactive scenario provided by the animation engine 116. The projector 108 can be implemented to help calibrate the camera 104 and to display interactive scenarios from the animation engine 116.

As previously mentioned, the control module 102 can include one or more applications 114 configured to detect and determine an impact location of a projectile and output coordinates of the projectile impact location. The one or more applications 114 can implement the components of the previously mentioned system 100 and various image processing techniques to detect where a projectile impacted a target.

Typically, the one or more applications 114 can include a a camera calibration process (or method), a first process (or method) for defining an area-of-interest, and a second process (or method) for detecting holes (or perforations) created by a projectile impacting a target in a defined area-of-interest. Generally, the first process can be implemented to define an area-of-interest on the target surface and then the second process can be implemented to detect impact locations of one or more projectiles on the target surface within the area-of-interest. Of note, as described hereinafter, the first process can be implemented in the camera calibration process and in conjunction with the second process to determine where a projectile impacted a target surface. As can be appreciated, the first process and the second process can be implemented as part of a single application or two different applications working together.

The camera calibration application can be implemented to calibrate the camera 104 to an area-of-interest on a target surface. Typically, the camera calibration application can be implemented when the projectile impact location system 100 is first moved to a shooting range and being initially setup in a shooting lane with a target. The camera calibration application can create a pixel map (or lookup table) of a target surface in the shooting lane. The pixel map may correlate pixels on a camera frame to pixels on the target surface. As can be appreciated, the pixel map may be used to determine coordinates of a projectile impact location on a camera frame to a location on the target surface. For instance, the camera calibration application can establish data to be used to translate camera pixel coordinates to coordinates used by the display space of the animation engine. Generally, the camera 104 can be calibrated with the filter 105 removed from the camera lens such that the camera 104 uses visible light to make the pixel map.

Figure 2A:
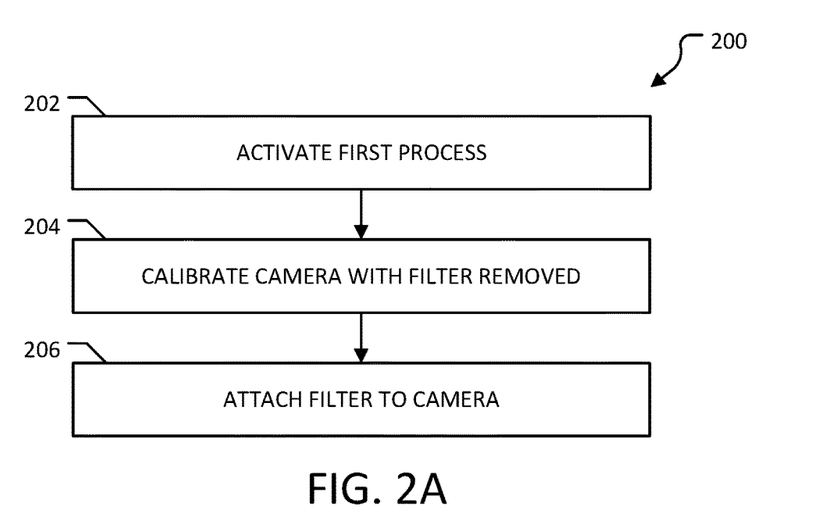
FIG. 2A is a flow diagram of a method of implementing a projectile impact location system according to one embodiment of the present invention.

Referring to FIG. 2A, a method 200 (or process) for calibrating a camera for use in the projectile impact location system 100 is illustrated. The method 200 can be implemented in an initial setup phase of the projectile impact location system 100. In a typical implementation, the initial setup phase can be implemented when the camera 104 of the projectile impact location system 100 is first being calibrated in a shooting (or firing) lane. In one embodiment, the previously mentioned camera calibration application can implement the method 200 to calibrate the camera 104. As previously mentioned, the camera 104 can be calibrated with visible light such that the filter 105 can typically be removed when calibrating the camera 104.

In block 202, the first process can be implemented to identify an area-of-interest on a target surface in a camera frame to exclude activity outside that area-of-interest. The area-of-interest can be implemented to mask an area outside the target area where an interactive scenario may be displayed. Various embodiments of the first process are described hereinafter. Of note, the first process can be implemented to create a mask image that may be used by the camera calibration application to ignore an area surrounding the target surface when creating a pixel map.

In block 204, the camera 104 of the system 100 can be calibrated. Typically, a focus of the camera 104 can be on the area-of-interest defined by the first process. Of note, the camera 104 can be calibrated with the filter 105 removed from a lens of the camera 104. In one embodiment, the step of calibration can make use of "plumb line scanning" methods. For instance, the projector 108 can project line patterns on the target surface in the area-of-interest to create a pixel map. The pixel map can include a lookup table for every pixel on the camera frame to a corresponding pixel on the target surface.

After the camera 104 has been calibrated, the method 200 can move to block 206. In block 206, the filter 105 can be attached to the camera 104 proximate the lens of the camera 104. In one embodiment, the filter 105 can be an infrared filter in the approximately 850-880 nm range to reduce a complexity of the camera images. The filter 105 can eliminate the visible animation from the frame of images captured by the camera 104. Of note, only a plain blank surface may appear in a video stream generated by the camera 104. As previously mentioned, an infrared light source can be used to ensure that the area-of-interest on the target surface is visible to the camera 104 once the filter 105 is attached proximate the lens of the camera 104. As can be appreciated, by implementing the filter 105, any images, videos, animations, etc. displayed on the target will not be seen by the camera 104 with the filter 105 attached.

Figure 2B:
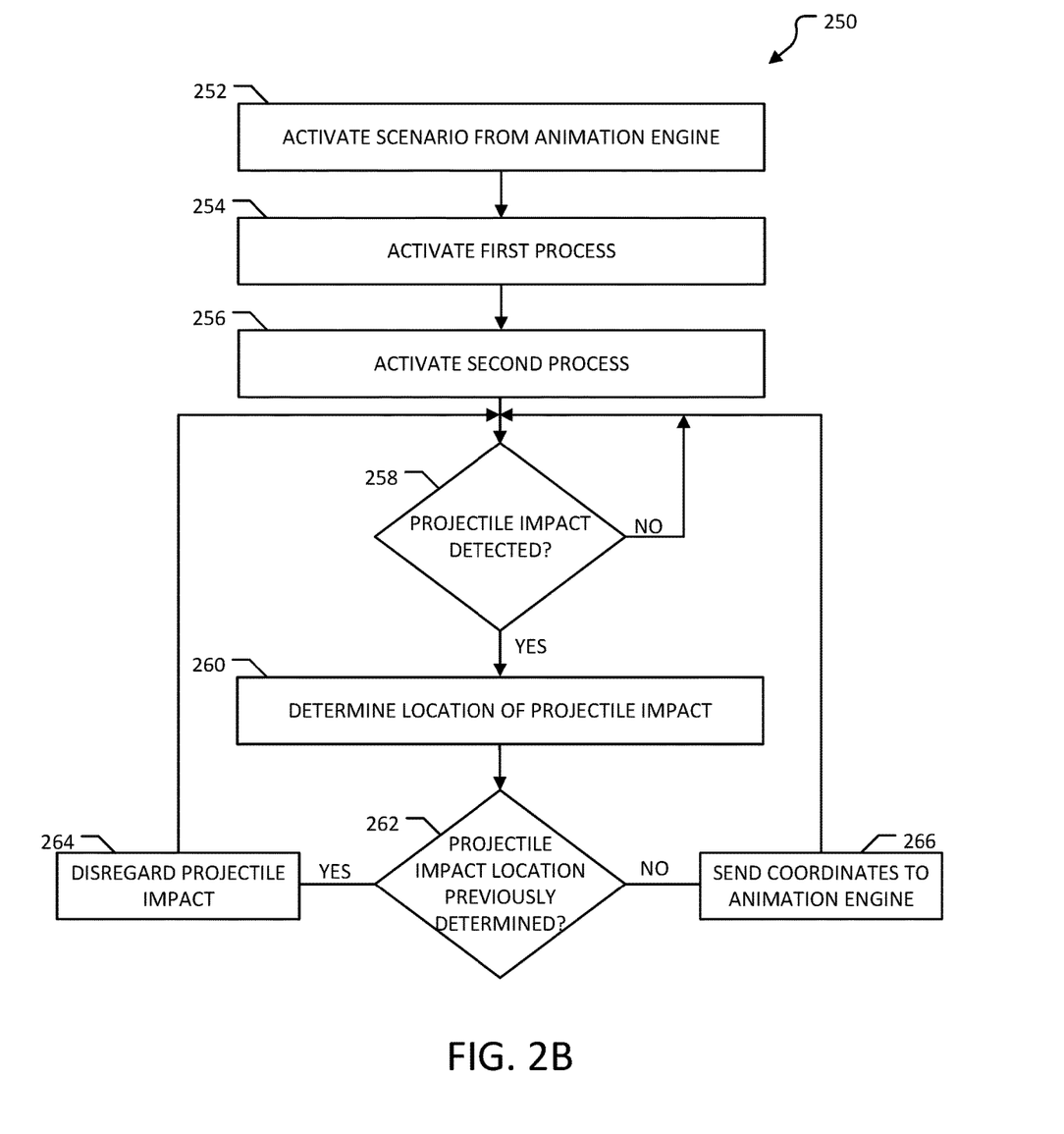
FIG. 2B is a flow diagram of a method of implementing a projectile impact location system according to one embodiment of the present invention.

Referring to FIG. 2B, a method (or process) 250 for determining a projectile impact location is illustrated. The method 250 can be implemented with the projectile impact location system 100 to detect projectile impact locations on a target. The method 250 can be implemented in an active phase of the projectile impact location system 100 each time a user selects an interactive scenario from the user interface 113 for the animation engine 116 to run. For instance, the active phase can be implemented after the projectile impact location system 100 is setup and the camera 104 has already been calibrated to the target surface. The method 250 can be started when a user selects an interactive scenario. As previously mentioned, the method 250 can be run each time a user selects an interactive scenario from the user interface 113 to be run by the animation engine 116. Generally, the control application can include logic for determining when to run the method 250. For instance, the control application may receive the input of the user selecting an interactive scenario an in response, initiate the method 250.

Generally, the camera 104 can be implemented to capture images of the target surface for analyzation by the method 250. As mentioned, the light source 106 can illuminate the target surface with infrared light such that the camera 104, with the filter 105 attached, may only see the target surface and not any videos, animations, etc. being displayed by the projector 108.

In block 252, an interactive scenario can be activated by the animation engine 116. For instance, the control module 102 may include a database that has one or more interactive scenarios for a user to choose from. As previously mentioned, the control application can present the interactive scenarios to the user via the user interface 113. Each of the scenarios may include an interactive video (or computer animation) that can be displayed by the projector 108. Of note, the scenarios can include at least one interactive feature whereby the scenario alters an animation, video segment, etc. in response to an input (e.g., a mouse click). For instance, the scenario may alter the interactive scenario based on receiving an input from the projectile impact location system 100 based on the system 100 detecting an impact from a projectile.

Once the interactive scenario has been selected and started by the animation engine 116, the first process can be activated in block 254. The first process can be implemented with the camera 104 having the filter 105 attached proximate a lens of the camera 104 and the target surface illuminated by the light source 106. The first process can define an area-of-interest on the target surface to create a masked image for use in the infrared spectrum for the second process. In one embodiment, the first process can be run while the animation engine is loading the interactive scenario. Typically, the first process can be completed and a mask image can be created before the interactive scenario is loaded and sent to the projector 108.

In block 256, the second process can be activated. Typically, the second process can be implemented multiple times per second to determine if a projectile impacted the target surface in the area-of-interest. Embodiments of the second process are described in detail hereinafter.

In decision block 258, the method 250 can determine whether or not a projectile impact was detected by the second process. If an impact was not detected, the method 250 can return to block 256. Of note, the projectile impact location application can be implemented a plurality of times a second to determine if an impact from a projectile hit the target surface.

If the second process determines an impact was detected, the method 250 can move to block 260. In block 260, the method 250 can determine a location of the projectile impact. Typically, camera coordinates for the impact location can be determined by the second process and the camera coordinates can be translated to display boundary coordinates that the animation engine may understand.

In decision block 262, the control application can determine if the detected impact location was previously determined. For instance, if an impact location of a projectile was detected while a prior scenario was run, the control application can store the coordinates for each detected projectile impact location in the databases 117. The control application may then use the stored projectile impact location data to determine if currently detected impact locations are new.

If the detected projectile impact location was not previously determined, the method 250 can move to block 266. In block 266, the control application can send the translated coordinates to the animation engine 116. For instance, the control application may send a simulated "mouse click" at the translated display boundary coordinates to the animation engine 116. Typically, the animation engine 116 may then execute a "mouse click" approximate the translated display boundary coordinates. As can be appreciated, if the mouse click is proximate a defined actionable area, the scenario may branch the animation. After the translated coordinates are sent, the method 250 can return to block 256.

If the detected projectile impact location was previously determined, the method 200 can move to block 264. In block 264, the control module 102 can disregard the projectile impact and the method 200 can return to block 256.

As previously mentioned, the first process can include a method (or process) for defining an area-of-interest on a target surface that masks an area surrounding the target so that the camera 104 ignores the area surrounding the area-of-interest. In one embodiment, the first process can be implemented as an application running on the control module 102. The area-of-interest application can be implemented to map coordinates for the area-of-interest on the target surface. Of note, the first process can be implemented when the camera 104 has the filter 105 removed in the initial setup phase and when the filter 105 is attached to the lens of the camera 105 in the active phase. Described hereinafter is one example embodiment of the first process.

First, the area-of-interest application can accumulate approximately two seconds of video frames into a composite image and apply a lightmapping effect to the composite image. The image can contain the brightest pixel values observed in the camera frame during the lightmapping process.

Second, the lightmap image can be passed through a segmentation filter (e.g., software designed to create a segmentation filter effect) using the Otsu method. The resulting segmented image can eliminate most of the background and retain the illuminated target surface.

Third, the segmented image can be passed through an edge detection filter (e.g., software designed to create an edge detection filter effect) using the Sobel method. Typically, the edge detection filter can be adjusted for "medium" sensitivity. The edge detection filter can identify edges of the target surface, while ignoring most surface features. Some residual edges from background lighting may also be detected.

Fourth, assuming the target surface is approximately centered in the camera frame, a random "seed point" can be chosen near the center of the edge detected image and marked with a filler value. A "flood fill" method can be used to expand the filler value to the edges of the target surface of the edge detected image.

Fifth, a novel "stripping" method can be implemented to remove all pixels from the filled image which are outside the target surface. In one example, the "stripping" method can start from the outer boundaries of the filled image and remove all pixels until it encounters the filler values. This can be implemented to eliminate residual edges which may be present outside the target surface boundaries.

Sixth, a "dilation" method can be applied to the stripped image. By applying the dilation method to the stripped image, any pinholes that may be left from the segmentation method can be eliminated when the camera 104 sees a poorly illuminated target surface.

Finally, the output of these processes can be a "mask image." The mask image can be black in all regions except the target surface. The mask image can define the "area-of-interest" for all subsequent processes and methods. For instance, the mask image can be implemented to define an area of interest for the camera calibration application or for the second process.

Of note, background motion and lighting changes outside the boundaries of the target surface can cause irrelevant edge detections which should be suppressed to maintain processing speed. Further, the area-of-interest can have any arbitrary shape. For instance, the area-of-interest may have a substantially circular shape in one instance, and then have a substantially rectangular shape in another instance. As can be appreciated, the area-of-interest application can be implemented to allow for an actual shape of a target surface being implemented.

After the area-of-interest application has finished, the camera 104 can be calibrated and camera coordinates for the defined area-of-interest can be measured using one or more plumb-line scanning methods. In one embodiment, the camera calibration application can make use of "plumb line scanning" methods. The camera calibration application can project line patterns on the target surface proximate the area-of-interest and analyze the resulting video images of that projection to create a lookup table (e.g., a pixel map) for every pixel on the camera frame to a corresponding pixel on a display surface used by the animation engine. Once the pixel map has been created, the pixel map can be stored for later use in operation of the animation engine 116. As can be appreciated, other means for calibrating the camera 104 and creating coordinates for each pixel are contemplated. The calibration process can be implemented to map each pixel on the target surface within the defined area-of-interest.

After the initial setup phase has been completed, the projection impact location system 100 can be ready for use by a user.

Once the area-of-interest on the target surface has been mapped, an interactive scenario can be selected by a user to be displayed by the projector 108. The user may use the touch input 110 to select an interactive scenario. Typically, the animation engine 116 can be implemented to provide content, including interactive scenarios, that may be displayed by the projector 108 on the target surface. Of significant note, the projectile impact location system 100 can be implemented independently of the animation engine 116. For instance, the animation engine 116 may be included in a separate system from the projectile impact location system 100. For instance, the animation engine 116 may be remotely and independently of the projectile impact location system 100. The animation engine 116 may be in communication with the system 100 where the system 100 may output coordinates of a projectile impact to the animation engine 116. In such an embodiment, the animation engine may include a means for displaying the interactive scenarios.

Each time an interactive scenario may be started, the first process can be activated to create a mask image for use by the camera 104 in the infrared spectrum. As previously mentioned, the filter 105 can be placed proximate a lens of the camera 104 before the first process is run in the active phase. In one embodiment, the mask image can be created each time a new interactive scenario is started in the active phase via the first process.

The second process can include a method (or process) to detect impact locations of projectiles on the target surface. In one embodiment, the second process can be implemented as an application running on the control module 102. Of note, the projectile impact location application can be implemented a plurality of times per second. For instance, the projectile impact location application can be run two or more times each second while an interactive scenario is running. In one example, the projectile impact location application can be run ten or more times per second while an interactive scenario is running.

In one example, the projectile impact location application can implement the following process (or method) to detect perforations, holes, tears, etc. in a target surface caused by a projectile.

First, a mask can be applied to the image to remove details outside the area-of-interest (e.g., the target surface). Typically, this step can be done by the area-of-interest application and the mask image can be implemented to black out everything outside the area-of-interest. It is to be appreciated that embodiments are contemplated where a mask of the target surface area is done by a process or application different from the first process. In such an embodiment, the mask image may be provided to the system 100 for the second process to use.

Second, a pixel detection process (or method) can be implemented to mark pixels that may be part of a perforation caused by a projectile. A plurality of pixel detection processes are described hereinafter. It is to be appreciated that the described pixel detection processes are not meant to be limiting and other means of pixel detection are contemplated.

Third, a final image can be scanned for marked pixels. A bounding box can be fitted around each contiguous group of edge markers. The projectile impact location application can compile a list of these bounding boxes.

Fourth, bounding boxes that are within specified size ranges and proportions can be identified as "projectile impact locations" and a list of these features can be passed to other system components for processing. For instance, when bounding box indicates a projectile impact location, the second process can determine coordinates on the camera frame corresponding to the location of the projectile impact location, which can then be translated to coordinates usable by the animation engine 116.

In some instances, a bounding box smaller than a specified size (e.g., 4×4) can be considered noise and may be ignored. A bounding box larger than a specified size (e.g., 20×20) can be considered a void and may be ignored. A bounding box with an aspect ratio of greater that 4:3 can be considered a flared edge and may be ignored.

As previously mentioned, the second process can be run multiple times per second to determine when a projectile impact is detected. Typically, the second process can be continually run until an interactive scenario is ended. The animation engine 116 may send a signal to the control module 102 that an interactive scenario has started or finished. In other instances, the control module 102 may include a means for determining when an interactive scenario is started or finished.

Figure 3:
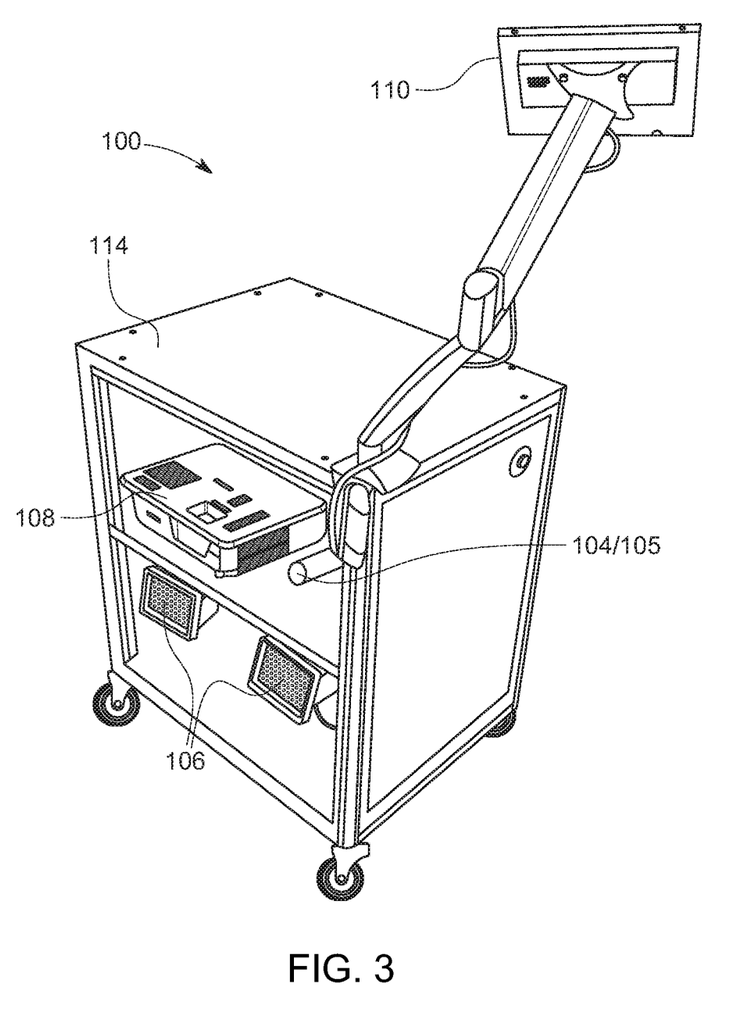
FIG. 3 is a detailed diagram of a projectile impact location system according to one embodiment of the present invention.
Figure 4:
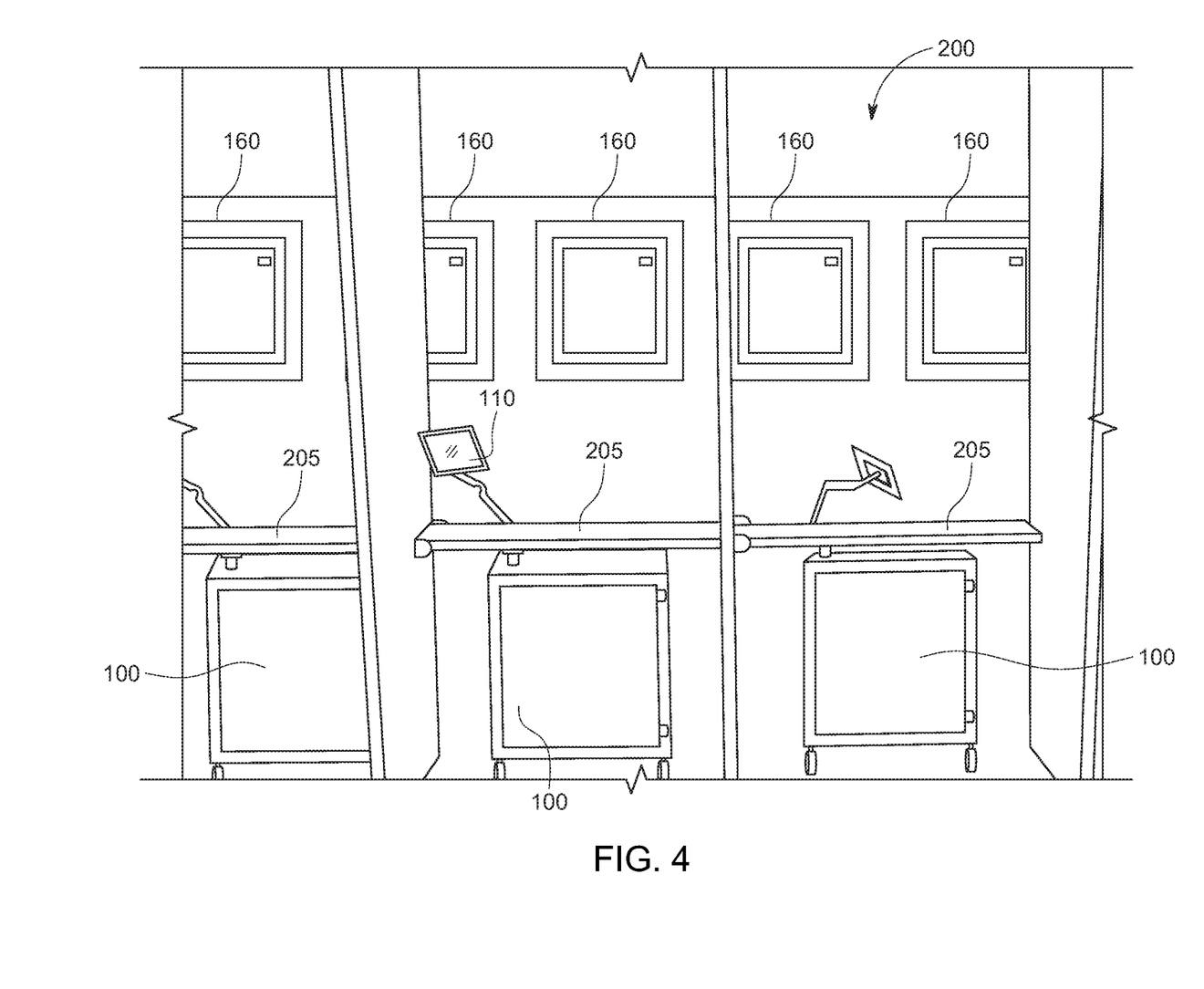
FIG. 4 is a detailed diagram of a projectile impact location system in a shooting range according to one embodiment of the present invention.

Referring to FIGS. 3-4, detailed diagrams of one embodiment of the projectile impact location system 100 are illustrated. Of note, the control module 102 is not shown in FIGS. 3-4.

Referring to FIG. 3, a front view of the projectile impact location system 100 housed on a cart 114 is illustrated. As shown, the cart 114 (or similar chassis) can allow the system 100 to be mobile. Typically, the cart 114 can be sized to fit under a table located in a lane of a firing range. The cart 114 is shown with the projector 108, light the source 106, and the camera 104 housed on different racks of the cart 114. As can be appreciated, the configuration shown in FIG. 3 is one example configuration of the components of the system 100 and is not meant to be limiting. As previously mentioned, the system 100 may be moved to a location already including a target and range for firing a firearm.

Referring to FIG. 4, a detailed diagram of multiple projectile impact location systems 100 in a firing range 200 is illustrated. As shown, the system 100 and cart 114 can be located substantially underneath a table 205 of each of the firing lanes. Further shown in FIG. 4 are rectangular targets 160 that may be implemented via the previously detailed processes such that the camera 104 focuses only on the targets 160 themselves and not the area surrounding the targets 160. Of significant note, the previously mentioned processes can be implemented to mask any shaped target thus minimizing an overall cost in implementing the system by not requiring a particular target to be implemented. As previously mentioned, the system 110 can include the touch input 110 adapted to receive input from a user to select various options while implementing the system 100. As shown, the touch input 110 can be located above the table 205 for easy interaction with a user.

Example Pixel Detection Processes

Described hereinafter are a plurality of example pixel detection processes that can be implemented to detect and mark pixels in an image that may denote impact locations from a projectile in the previously described projectile impact location application. Of note, these pixel detection processes are typically implemented when the camera 104 has the filter 105 attached to a lens of the camera 104. As can be appreciated, the camera 104 may only see images in the infrared spectrum which blocks out the video, animation, etc. being generated by the animation engine and displayed by the projector 108.

In a first example, the pixel detection process can include, but is not limited, the following steps.

In a first step, an integral image (e.g., a partial sum matrix) can be computed for a current frame.

In a second step, for each pixel in the current frame, an average pixel brightness can be computed for a small bounding box and a large bounding box surrounding the pixel. The integral image can be used to speed up this computation. The sizes of the small and large bounding boxes are adjustable parameters.

In a third step, if an average brightness of the large bounding box exceeds the average brightness of the small bounding box by a predetermined threshold, the pixel can be marked as a perforation on a detection frame. The threshold value used for detection can be an adjustable parameter. Pixels can be excluded from the detection process if the pixels (i) are located outside of the area-of-interest, (ii) were detected previously as a perforation, (iii) are near an edge of the area-of-interest, or (iv) are near previously detected perforations. An exclusion distance to the edge can be an adjustable parameter. An exclusion distance to a previously marked perforation can be an adjustable parameter.

As previously mentioned, the projectile impact location application can run through each of these steps two or more times a second to locate new holes (or perforations) in the target area created by a projectile. The system may then translate the camera coordinates to display boundary coordinates for the animation engine to perform a "mouse click" at the coordinates to effect an actionable change in the interactive scenario.

In a second example, the pixel detection process can include, but is not limited, the following steps.

In a first step, an image subtraction procedure can generate a difference frame with pixels that are a difference between the pixels of a current frame and a previous frame. The previous frame can typically be at least one second, but not more than two seconds, older than the current frame.

In a second step, pixels in the difference frame can be normalized to a mid-range brightness level where zero difference may be expressed as a mid-range value to generate a normalized difference frame. Lighter and darker pixels can be set to offsets from the mid-range.

In a third step, an average difference of pixels from the current frame and the previous frame can be computed and saved.

In a fourth step, a contrast enhancement procedure can be applied to the normalized difference frame.

In a fifth step, a dilation procedure can be applied to the normalized difference frame to generate a dilated frame. The amount of dilation can be an adjustable parameter.

In a sixth step, a Sobel edge detection procedure can be applied to the dilated frame. The threshold value used for edge detection can be twice the average difference of pixels that was previously saved. The modified Sobel procedure can exclude pixels outside the area-of-interest and pixels detected previously as projectile impact locations.

In a third example, the pixel detection process can include, but is not limited, the following steps.

In a first step, an image subtraction procedure can generate a difference frame with pixels that are a difference between the pixels of a current frame and a previous frame. The previous frame can be at least one second, but not more than two seconds, older than the current frame.

In a second step, pixels in the difference frame can be normalized to a mid-range brightness level where zero difference may be expressed as a mid-range value to generate a normalized difference frame. Lighter and darker pixels can be set to offsets from the mid-range.

In a third step, a dilation procedure can be applied to the normalized difference frame to generate a dilated frame. The amount of dilation can be an adjustable parameter.

In a fourth step, a Laplace edge detection procedure can be applied to the dilated frame to generate a Laplace detection frame. A threshold value used for edge detection can be an adjustable parameter. The modified Laplace procedure can exclude pixels outside the area-of-interest and pixels detected previously as projectile impact locations.

In a fifth step, A dilation procedure can be applied to the Laplace detection frame. The amount of dilation can be an adjustable parameter.

In a fourth example, the pixel detection process can include, but is not limited, the following steps.

In a first step, a median filter method can be applied to the masked image to generate a median filtered image. The median filter may reduce noise levels in the masked image.

In a second step, a Sobel edge detection method can be applied to the median filtered image using a "medium" level of sensitivity to generate an edge detection image.

In a third step, a stripping method can be applied to the edge detection image to remove the outer edges of the target surface which may be picked up by the Sobel edge detector. A stripped image can be generated in this step.

In a fourth step, a specialized erosion method (e.g., a sparkle remover) can be applied to the stripped image. The specialized erosion method may remove any "single pixel" edges from the stripped image that may be considered noise. A de-sparkled image can be generated in this step.

In a fifth step, a conventional dilation method can be applied to the de-sparkled image to generate a dilated image. The conventional dilation method may expand the detected edges. Of note, this makes possible projectile impact location features more prominent.

In a sixth step, a conventional erosion method can be applied to the dilated image. This step can maintain separation of nearby features, which may be projectile impact locations.

In a fifth example, the pixel detection process can include, but is not limited, the following steps.

First, an image subtraction procedure can generate a difference frame with pixels that are a difference between the pixels of a current frame and a previous frame. The previous frame can typically be at least one second, but not more than two seconds, older than the current frame.

Second, pixels in the difference frame can be normalized to a mid-range brightness level where zero difference may be expressed as a mid-range value to generate a normalized difference frame. Lighter and darker pixels can be set to offsets from the mid-range.

In a third step, a 9×9 convolution matrix can be applied to each pixel in the difference frame to identify pixels in a center of a projectile impact location. This can produce a detection frame.

In a fourth step, A dilation procedure can be applied to the detection frame to generate a dilation frame. The amount of dilation can be an adjustable parameter.

In a sixth example, the pixel detection process can include, but is not limited, the following steps.

In a first step, an erosion procedure can be applied to a current frame to generate an eroded frame. The amount of erosion can be an adjustable parameter.

In a second step, a dilation procedure can be applied to the eroded frame to generate a dilated frame. The amount of dilation can be an adjustable parameter.

In a third step, A Sobel edge detection procedure can be applied to the dilated frame to generate a detection frame. The threshold value used for edge detection can be an adjustable parameter. The modified Sobel procedure can exclude pixels outside the area-of-interest and pixels detected previously in projectile impact locations.

In a fourth step, a novel "sparkle removal" procedure can be used to remove single bright pixels from the detection frame.

In a fifth step, a dilation procedure can be applied to the detection frame, to generate a final detection frame. The amount of dilation can be an adjustable parameter.

In a seventh example, the pixel detection process can include, but can be not limited, the following steps.

First, an image subtraction procedure can generate a difference frame with pixels that are a difference between the pixels of a current frame and a previous frame. The previous frame can typically be at least one second, but not more than two seconds, older than the current frame.

Second, pixels in the difference frame can be normalized to a mid-range brightness level where zero difference may be expressed as a mid-range value to generate a normalized difference frame. Lighter and darker pixels can be set to offsets from the mid-range.

In a third step, a dilation procedure can be applied to the normalized difference frame to generate a dilated frame. The amount of dilation can be an adjustable parameter.

In a fourth step, a Sobel edge detection procedure can be applied to the dilated frame to generate a Sobel detection frame. The threshold value used for edge detection can be twice the average difference of pixels. The modified Sobel procedure can exclude pixels outside the area-of-interest and pixels detected previously in projectile impact locations.

In a fifth step, A dilation procedure can be applied to the Sobel detection frame. The amount of dilation can be an adjustable parameter.

In an eighth example, the pixel detection process can include, but is not limited, the following steps.

In a first step, an image subtraction procedure can generate a difference frame with pixels that are a difference between the pixels of a current frame and a previous frame. The previous frame can typically be at least one second, but not more than two seconds, older than the current frame.

In a second step, pixels in the difference frame can be normalized to a mid-range brightness level where zero difference may be expressed as a mid-range value to generate a normalized difference frame. Lighter and darker pixels can be set to offsets from the mid-range.

In a third step, an average difference of pixels from the current frame and the previous frame can be computed and saved.

In a fourth step, a dilation procedure can be applied to the normalized difference frame to generate a dilated frame. The amount of dilation can be an adjustable parameter.

In a fifth step, a Laplace edge detection procedure can be applied to the dilated frame to generate a Laplace detection frame. The threshold value used for edge detection can be the average difference of pixels that was previously saved. The modified Laplace procedure can exclude pixels outside the area-of-interest and pixels detected previously in projectile impact locations.

In a sixth step, A dilation procedure can be applied to the Laplace detection frame. The amount of dilation can be an adjustable parameter.

In a ninth example, the pixel detection process can include, but is not limited, the following steps.

In a first step, an image subtraction procedure can generate a difference frame with pixels that are a difference between the pixels of a current frame and a previous frame. The previous frame can typically be at least one second, but not more than two seconds, older than the current frame.

In a second step, pixels in the difference frame can be normalized to a mid-range brightness level where zero difference may be expressed as a mid-range value to generate a normalized difference frame. Lighter and darker pixels can be set to offsets from the mid-range.

In a third step, an integral image (or partial sum matrix) can be computed for the difference frame.

In a fourth step, for each pixel in the difference frame, an average pixel brightness can be computed for a small bounding box and a large bounding box surrounding the pixel. The integral image can be used to speed up this computation. The sizes of the small and large bounding boxes can be adjustable parameters.

In a fifth step, if an average brightness of the large bounding box exceeds the average brightness of the small bounding box by a predetermined threshold, the pixel can be marked as a perforation on a detection frame. The threshold value used for detection can be an adjustable parameter. Pixels can be excluded from the detection process if the pixels (i) are located outside of the area-of-interest, (ii) were detected previously as a perforation, (iii) are near an edge of the area-of-interest, or (iv) are near previously detected perforations. An exclusion distance to the edge can be an adjustable parameter. An exclusion distance to a previously marked perforation can be an adjustable parameter.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

We claim:

1. A method for detecting a projectile impact location on a target surface, the method comprising:
displaying an interactive scenario from an animation engine approximate the target surface;
activating a first process to create a mask image, the first process including the steps of:

accumulating approximately 2 seconds of video frames into a composite image;

applying a lightmapping effect to the composite image to generate a lightmap image;

applying a segmentation filter to the lightmap image using an Otsu method to generate a segmented image;

applying an edge detection filter to the segmented image using the Sobel method to generate an edge detected image;

choosing a seed point approximate a center of the edge detected image and marking the seed point with a filler value;

applying a flood fill method to expand the filler value to edges of the target surface of the edge detected image to generate a filled image;

applying a stripping method to the filled image to remove all pixels located outside of the target surface to generate a stripped image;

applying a dilation method to the stripped image to generate a dilated image; and creating the mask image from the dilated image, the mask image defining the area-of-interest on the target;

activating a second process, the second process configured to detect perforations in an area-of-interest on the target surface;

determining coordinates on a camera frame of a perforation when detected by the second process; and sending coordinates of the perforation to the animation engine.

2. The method of claim 1, wherein the second process includes the steps of:

applying the mask image to a current image frame to create a modified current image frame;

analyzing the modified current image frame with a pixel detection process;

marking pixels determined to be part of a perforation in the modified current image frame;

fitting a bounding box around each contiguous group of edge markers of the marked pixels; and determining if any of the edge marker bounding boxes are within a specified range and proportion to be identified as projectile impact locations.

3. The method of claim 2, wherein the pixel detection process includes the steps of:

generating an integral image from the modified current image frame;

computing an average pixel brightness for a small bounding box surrounding each pixel in the modified current image frame;

computing an average pixel brightness for a large bounding box surrounding each pixel in the modified current image frame;

determining if an average brightness of a large bounding box exceeds an average brightness of a small bounding box by a predetermined threshold for any pixel in the modified current image frame; and marking a pixel as a perforation when an average brightness of a large bounding box exceeds an average brightness of a small bounding box by the predetermined threshold.

4. The method of claim 1, wherein the coordinates are translated from camera coordinates into display boundary coordinates before being sent to the animation engine.

5. The method of claim 4, wherein the animation engine executes a mouse click approximate the translated display boundary coordinates in the interactive scenario.

6. The method of claim 1, further including a camera calibration process, the camera calibration process comprising the steps of:

activating the first process to (i) define an area-of-interest on a target surface and (ii) generate a camera mask image;

calibrating a camera to the area-of-interest on the target surface with (i) the camera mask image, (ii) a plumb line scanning method, and (iii) a filter removed from the camera;

generating a pixel map of the area-of-interest; and attaching the filter to the camera.

7. The method of claim 6, wherein the filter blocks all electromagnetic radiation except electromagnetic radiation in the infrared spectrum.

8. The method of claim 6, wherein the pixel map includes a lookup table for every pixel in a camera frame corresponding to a pixel on a display surface used by the animation engine.

9. A method for detecting a projectile impact location, the method comprising:

providing a projectile impact location system, the system comprising:

a computing device configured to run a first process and a second process;

a camera including a filter;

an infrared light source; and a displaying device;

running the first process to define a camera area-of-interest on a target surface, the first process including the steps of:

accumulating approximately 2 seconds of video frames into a composite image;

applying a lightmapping effect to the composite image to generate a lightmap image;

applying a segmentation filter to the lightmap image using an Otsu method to generate a segmented image;

applying an edge detection filter to the segmented image using the Sobel method to generate an edge detected image;

choosing a seed point approximate a center of the edge detected image and marking the seed point with a filler value;

applying a flood fill method to expand the filler value to edges of the target surface of the edge detected image to generate a filled image;

applying a stripping method to the filled image to remove all pixels located outside of the target surface to generate a stripped image;

applying a dilation method to the stripped image to generate a dilated image; and generating a mask image from the dilated image, the mask image defining the camera area-of-interest on the target surface or the scenario area-of-interest on the target surface;

calibrating the camera to the camera area-of-interest on the target surface with the filter removed;

attaching the filter to the camera;

running the first process to define a scenario area-of-interest with the filter attached to the camera;

displaying an interactive scenario from an animation engine approximate to and on the target surface;

running the second process to detect perforations in the scenario area-of- interest on the target surface;

determining camera coordinates of a perforation when detected by the second process; and sending coordinates of the perforation to the animation engine.

10. The method of claim 9, wherein the second process includes the steps of:

applying a mask image to a current image frame to create a modified current image frame;

analyzing the modified current image frame with a pixel detection process;

marking pixels determined to be part of a perforation in the modified current image frame;

fitting a bounding box around each contiguous group of edge markers of the marked pixels; and determining if any of the edge marker bounding boxes are within a specified range and proportion to be identified as projectile impact locations.

11. The method of claim 10, wherein the pixel detection process includes the steps of:

generating an integral image from the modified current image frame;

computing an average pixel brightness for a small bounding box surrounding each pixel in the modified current image frame;

computing an average pixel brightness for a large bounding box surrounding each pixel in the modified current image frame;

determining if an average brightness of a large bounding box exceeds an average brightness of a small bounding box by a predetermined threshold for any pixel in the modified current image frame; and marking a pixel as a perforation when an average brightness of a large bounding box exceeds an average brightness of a small bounding box by the predetermined threshold.

12. The method of claim 9, wherein the animation engine is stored and run by the computing device.

13. The method of claim 9, wherein the animation engine (i) is located remotely and independently from the computing device, and (ii) is in communication with the computing device.

14. The method of claim 9, wherein the filter is removably coupled to a lens of the camera.

15. The method of claim 9, wherein the projectile impact location system is housed on a cart.

16. The method of claim 15, wherein the cart is configured to fit under a table located in a lane in an indoor shooting range.

17. The method of claim 9, wherein the light source is a light emitting diode lamp that produces infrared light in the infrared spectrum.

18. A method for detecting a projectile impact location, the method comprising:

providing a projectile impact location system, the system comprising:

a computing device configured to run a projectile impact location process;

a camera including a filter;

an infrared light source; and a displaying device;

running a first process to generate a mask image;

running the projectile impact location process, the projectile impact location process including the steps of:

applying the mask image to a current image frame to create a modified current image frame;

analyzing the modified current image frame with a pixel detection process, the pixel detection process including the steps of:

generating an integral image from the modified current image frame;

computing an average pixel brightness for a small bounding box surrounding each pixel in the modified current image frame;

computing an average pixel brightness for a large bounding box surrounding each pixel in the modified current image frame;

determining if an average brightness of a large bounding box exceeds an average brightness of a small bounding box by a predetermined threshold for any pixel in the modified current image frame; and marking a pixel as a perforation when an average brightness of a large bounding box exceeds an average brightness of a small bounding box by the predetermined threshold;

marking pixels determined to be part of a perforation in the modified current image frame;

fitting a bounding box around each contiguous group of edge markers of the marked pixels; and determining if any of the edge marker bounding boxes are within a specified range and proportion to be identified as projectile impact locations;

sending coordinates of the perforation to the animation engine.

* * * * *